United States Patent [19]

Takahashi et al.

[11] Patent Number: 5,209,872

[45] Date of Patent: May 11, 1993

[54] RUBBER COMPOSITION AND METHOD FOR MAKING

[75] Inventors: Masaharu Takahashi; Tsutomu Nakamura, both of Annaka; Kazuo Numata, Usui, all of Japan

[73] Assignee: Shin-Etsu Chemical Co., Ltd., Tokyo, Japan

[21] Appl. No.: 628,877

[22] Filed: Dec. 18, 1990

[30] Foreign Application Priority Data

Dec. 25, 1989 [JP] Japan .................................. 1-337949
Dec. 25, 1989 [JP] Japan .................................. 1-337950

[51] Int. Cl.$^5$ ............................ H01R 1/06; C08K 8/04
[52] U.S. Cl. ..................................... 252/511; 524/495; 524/496
[58] Field of Search ................. 252/511; 524/495, 496

[56] References Cited

U.S. PATENT DOCUMENTS

| | | | |
|---|---|---|---|
| 3,936,170 | 2/1976 | Shibano et al. | 252/511 |
| 4,062,813 | 12/1977 | Andrianov et al. | 252/511 |
| 4,250,075 | 2/1981 | Monroe et al. | 252/511 |
| 4,273,697 | 6/1981 | Sumimura et al. | 252/511 |
| 4,431,982 | 2/1984 | Monroe et al. | 252/511 |
| 4,505,848 | 3/1985 | Kobayashi | 252/511 |
| 4,714,734 | 12/1987 | Hashimoto et al. | 524/496 |
| 4,775,500 | 10/1988 | Funakoshi et al. | 264/72 |
| 4,874,549 | 10/1989 | Michaelchik | 252/511 |
| 4,929,388 | 5/1990 | Wessling | 252/511 |
| 4,956,203 | 9/1990 | Kroupa | 252/511 |
| 5,015,413 | 5/1991 | Nagaoka | 252/511 |

FOREIGN PATENT DOCUMENTS

18406/88  3/1990  Australia .
0653350  12/1962  Canada .

*Primary Examiner*—Paul Lieberman
*Assistant Examiner*—William S. Parks
*Attorney, Agent, or Firm*—Millen, White, Zelano & Branigan

[57] ABSTRACT

A conductive rubber composition is prepared by blending (A) a rubber composition including natural and/or synthetic rubber and conductive carbon black, with (B) a silicone rubber composition including an organopolysiloxane having the average composition formula: $R_nSiO_{(4-n)/2}$ wherein R is a hydrocarbon group and n is a positive number of from 1.95 to 2.05. This rubber composition and cured products thereof have stable electric resistivity in the semiconductive range and are thus suitable as rubber roll members in business machines.

11 Claims, No Drawings

RUBBER COMPOSITION AND METHOD FOR MAKING

This invention relates to a rubber composition capable of affording rubber articles having a stable electric resistivity in the semiconductive range of from $10^3$ to $10^{10}$ Ω·cm, and a method for preparing the same.

BACKGROUND OF THE INVENTION

Rubbery materials are usually electric insulators. A number of conductive rubbers are available as mixtures of rubbery material and conductive agents. For example, rubbers having carbon black blended therein to provide an electric resistivity of from $10^{-1}$ to $10^2$ Ω·cm are conductive rubbers which are used in various applications.

Silicone rubber is also widely used as electrically insulating rubber because of its heat resistance, low-temperature resistance and weatherability. It can also be used as conductive silicone rubber by adding conductive agents like the other rubbery materials.

The conductive agents which are added to silicone rubber for imparting electric conductivity are typically carbon black, graphite, various metal powders such as silver, nickel, and copper, various non-conductive particles and monofilaments surface treated with silver or similar metals, carbon fibers, and metallic fibers. By mixing these conductive agents, the electric resistivity of silicone rubber can be reduced to the order of $10^{10}$ to $10^{-3}$ Ω·cm depending on the type and amount of conductive agent without detracting from the inherent properties of silicone rubber.

However, silicone rubbers having conductive carbon black such as Ketjen black and acetylene black blended therein show a substantial variation of electric resistivity in the semiconductive range of from $10^3$ to $10^{10}$ Ω·cm. It is difficult to maintain the electric resistivity of carbon black filled silicone rubbers stable probably because the dispersion of carbon substantially varies with molding conditions.

A variety of rubbery parts are used in business machines. These rubbery members represent a demand for rubbery material having electric resistivity in the semiconductive range. Therefore, there is a need for rubbery material exhibiting a minimal variation of electric resistivity in the semiconductive range, that is, a stable electric resistivity.

SUMMARY OF THE INVENTION

An object of the present invention is to provide a new and improved rubber composition capable of affording rubber articles exhibiting a limited variation of electric resistivity in the semiconductive range. Another object is to provide a rubber composition capable of affording rubber articles having a stable electric resistivity independent of molding conditions. A further object is to provide a method for forming such a rubber composition.

The inventors have found that by mixing (A) a rubber composition including natural and/or synthetic rubber and conductive carbon black with (B) a silicone rubber composition including an organopolysiloxane having the average composition formula (1):

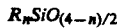

$$R_nSiO_{(4-n)/2} \quad (1)$$

wherein R is a substituted or unsubstituted monovalent hydrocarbon group having 1 to 10 carbon atoms, and n is a positive number of from 1.95 to 2.05, there is obtained a rubber composition which yields rubber articles having a well stabilized electric resistivity in the range of from $10^3$ to $10^{10}$ Ω·cm.

More particularly, a rubber composition in the form of a mixture of (A) a rubber composition including natural and/or synthetic rubber and conductive carbon black and (B) a silicone rubber composition including an organopoly-siloxane having average composition formula (1) has a well stabilized electric resistivity in the semiconductive range which does not depend on molding conditions. It shows a variation of electric resistivity of the order of only one figure, in contrast to conventional silicone rubbers filled with conductive carbon black showing a variation of the order of 4 to 6 figures. The composition is also improved in moldability and vulcanization, and provides cured rubbers which have good rubbery elasticity and low hardness and do not release conductive carbon.

Therefore, the present invention provides a rubber composition comprising, in admixture, (A) a rubber composition including natural and/or synthetic rubber and conductive carbon black and (B) a silicone rubber composition including an organopolysiloxane having average composition formula (1). The present invention also provides a method for preparing a rubber composition by mixing rubber composition (A) with silicone rubber composition (B) both defined above.

DETAILED DESCRIPTION OF THE INVENTION

The rubber composition of the invention is defined as comprising, in admixture, (A) a rubber composition including natural and/or synthetic rubber and conductive carbon black and (B) a silicone rubber composition including an organo-polysiloxane having average composition formula (1).

The natural and synthetic rubbers used herein are not particularly limited and any desired one of commercially available natural and synthetic rubbers or mixtures thereof may be used. Examples of the synthetic rubber include styrene-butadiene rubbers, acrylonitrile-butadiene rubbers, hydrogenated acrylonitrile-butadiene rubbers, butadiene rubbers, isoprene rubbers, chloroprene rubbers, acrylic rubbers, silicone-modified EPDM rubbers, silicone-modified acrylic rubbers, ethylene-acrylate rubbers, ethylene-vinyl acetate rubbers, urethane rubbers, polysulfide rubbers, chlorosulfonated polyethylene rubbers, chlorinated polyethylene rubbers, fluorinated rubbers, epichlorohydrin rubbers, and mixtures thereof. The preferred synthetic rubbers are ethylene-propylene rubbers (EPM) and ethylene-propylene-diene rubbers (EPDM). Commercially available EPM and EPDM rubbers may be used although those rubbers having an ethylene content of 40 to 70% by weight and a Mooney viscosity of 5 to 100 are especially preferred. The diene monomers which form the EPDM rubbers include ethylidene norbornene, dicyclopentadiene, and 1,4-hexadiene and their degree of unsaturation should preferably have an iodine value in the range of from 1 to 40.

The rubber composition (A) also includes electro-conductive carbon black. It may be selected from commonly used types of conductive carbon black, for example, acetylene black, conducting furnace black (CF), super conducting furnace black (SCF), extra conducting furnace black (XCF), conducting channel black (CC), and furnace black and channel black heat treated at elevated temperatures of about 1500° C. More particularly, the acetylene black includes Denka Acetylene Black manufactured by Denki Kagaku K.K., Shawinigan Acetylene Black manufactured by Shawinigan Chemical Co., the conducting furnace black includes Continex CF manufactured by Continental Carbon Co. and Vulcan C manufactured by Cabot Corp., the super conducting furnace black includes Continex SCF manufactured by Continental Carbon Co. and Vulcan SC manufactured by Cabot Corp., the extra conducting furnace black includes Asahi HS-500 manufactured by Asahi Carbon K.K. and Vulcan XC-72 manufactured by Cabot Corp., and the conducting channel black includes Corax L manufactured by Degussa Co. Also useful are modified furnace blacks commercially available as Ketjen Black EC and Ketjen Black EC-600JD from Ketjen Black International.

The conductive carbon black may be used alone or in admixture of two or more types, preferably in an amount of from 1 to 50 parts, more preferably from 3 to 20 parts by weight per 100 parts by weight of the natural and/or synthetic rubber. Less than 1 part of carbon black would fail to provide desired electric conduction whereas more than 50 parts of carbon black would sometimes result in a harder rubber composition which is rather poor in molding and yields cured products having low mechanical strength.

The silicone rubber composition (B) includes an organo-polysiloxane having average composition formula (1).

$$R_n SiO_{(4-n)/2} \tag{1}$$

In formula (1), R is a Substituted or unsubstituted monovalent hydrocarbon group having 1 to 10 carbon atoms, preferably having 1 to 6 carbon atoms, for example, alkyl groups such as methyl, ethyl and propyl, cycloalkyl groups such as cyclopentyl and cyclohexyl, alkenyl groups such as vinyl and allyl, cycloalkenyl groups, aryl groups such as phenyl and tolyl, and halogenated or cyano hydrocarbon groups in which some of the hydrogen atoms of these groups are replaced by fluorine atoms, chlorine atoms, and organic groups such as chloromethyl, γ-trifluoropropyl, perfluoro-alkyl and cyano groups. Letter n is a positive number of from 1.95 to 2.05.

The preferred organopolysiloxanes are those having a backbone predominantly comprising dimethylpolysiloxane units in which phenyl, vinyl and other groups are additionally introduced. Preferably, methyl groups occupy 30 to 100 mol %, preferably 55 to 100 mol %, more preferably 80 to 100 mol % of the R groups while phenyl groups occupy 0 to 30 mol %, especially 0 to 15 mol % of the R groups and vinyl groups occupy 0 to 10 mol %, especially 0 to 5 mol % of the R groups. More preferably, the R groups contain more than 0.001 mol % of vinyl.

The preferred organopolysiloxanes have a viscosity of 10,000 to 10,000,000 centistokes (cs), especially 100,000 to 10,000,000 cs at 25° C.

Preferably, the rubber composition of the invention contains 5 to 95% by weight, more preferably 20 to 80% by weight of the organopolysiloxane.

The rubber composition comprising natural and/or synthetic rubber, conductive carbon black, and an organo-polysiloxane having average composition formula (1) as defined above according to the invention is obtained by preparing a rubber composition (A) including natural and/or synthetic rubber and conductive carbon black, separately preparing a silicone rubber composition (B) including the organopolysiloxane of formula (1), and mixing these rubber compositions (A) and (B). Then the phase of carbon black previously dispersed in composition (A) is macroscopically dispersed in composition (B). The macroscopic dispersion used herein means a size of 0.1 to 100 μm and is effective in stabilizing volume resistivity.

More particularly, rubber composition (A) including natural and/or synthetic rubber and conductive carbon black, and silicone rubber composition (B) including an organopoly-siloxane of average composition formula (1) form an island structure in which two phases dimensioned 0.1 μm to 100 μm are macroscopically dispersed one another. Since carbon black provides stronger interaction with natural and/or synthetic rubber, the carbon black added to natural and/or synthetic rubber does not migrate to the phase of silicone rubber composition (B). Therefore, carbon black is kept uniformly dispersed in the natural and/or synthetic rubber as composition (A), which phase is macroscopically dispersed and distributed with the phase of silicone rubber composition (B), leading to stable volume resistivity.

In turn, if conductive carbon black were previously blended in a silicone rubber composition and this silicone rubber composition were blended with natural and/or synthetic rubber which is free of conductive carbon black, or if these three components were mixed at the same time, a microscopic dispersion of conductive carbon black would occur rather than the macroscopic dispersion of conductive carbon black, resulting in a rubber composition having unstable volume resistivity. The term microscopic dispersion corresponds to the size of the carbon black as blended. If conductive carbon black were added to a preblend of natural and/or synthetic rubber and silicone rubber, the carbon black would not undergo macroscopic dispersion, also resulting in unstable volume resistivity.

In the practice of the present invention, rubber composition (A) is obtained by mixing natural and/or synthetic rubber with conductive carbon black. The mixing method is not particularly limited insofar as a uniform preblend is obtained. Mixing methods using conventional rubber compounding mills such as Banbury mixers, pressure kneaders, two-roll and three-roll mills are satisfactory.

It is to be noted that composition (A) of natural and/or synthetic rubber may contain any desired additives, for example, processing oil for viscosity adjustment, anti-oxidants for heat resistance improvement, UV absorbers, carbon functional silane, flame retardants, and extending fillers such as clay.

The silicone rubber composition (B) can consist solely of an organopolysiloxane of formula (1), but may contain any ingredients commonly blended in conventional silicone rubber compositions, for example, fillers such as wet silica, dry silica, and quartz powder, low viscosity hydroxyl-terminated silicone fluid, and carbon functional silane if desired. These ingredients are mixed to form silicone rubber composition (B) by any desired mixing method as described for composition (A).

It should be understood that silicone rubber composition (B) may be a commercially available one, for example, KE931u, KE951u, KE520 and KE555u manufactured from Shin-Etsu Chemical Corporation.

Silicone rubber compositions (A) and (B) are preferably blended in a weight ratio of from 5:95 to 95:5, more preferably from 20:80 to 80:20 for providing a desired electric resistivity.

Natural and/or synthetic rubber composition (A) and silicone rubber composition (B) may be blended by any desired mixing method using conventional rubber compounding mills such as Banbury mixers, pressure kneaders, two-roll and three-roll mills. For facilitating milling operation, quartz powder, wet or dry silica, process oil commonly added to synthetic rubbers, carbon functional silane, modified silicone fluid and other processing aids may be added, if desired.

The rubber composition of the invention may be vulcanized and cured by conventional methods. The curing agent used herein need not have a limited curing mechanism insofar as it functions to vulcanize and cure the rubber composition by utilizing radical, addition, condensation and similar reactions commonly encountered in the vulcanization of conductive silicone rubbers. Any desired one of conventional well-known curing agents may be used in an effective amount. Typical curing agents are peroxides, for example, alkyl peroxides such as di-t-butylperoxide and 2,5-dimethyl-2,5-di(t-butylperoxy)hexane, and aralkyl peroxides such as dicumyl peroxide and sulfur and sulfur compounds such as zinc dimethyldithiocarbamate, zinc diethyldithio-carbamate, and mercaptobenzothiazole. Also useful are addition reaction curing agents such as organohydrogen-polysiloxanes having at least two silicon-bonded hydrogen atoms in a molecule and platinum series catalysts and condensation curing agents such as polyfunctional alkoxysilanes or siloxanes and organometallic acid salts. The curing agent may be used in such an amount as commonly added to conventional conductive silicone rubbers.

Examples of the alkoxysilane curing agent include $$CH_3Si(O-\overset{\overset{O}{\|}}{C}CH_3)_3,$$

$$CH_3Si(OCH_3)_3,$$

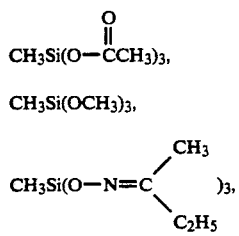

and

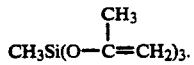

The alkoxysilane curing agent is used in an amount of 2 to 50% by weight based on the weight of the organopolysiloxane.

The rubber composition of the invention may be molded by conventional methods such as press molding, extrusion molding, injection molding, and calendering and then cured into articles which are ready for commercial use. For example, the rubber composition may be vulcanized by heating at a temperature of 150° to 180° C. for 10 minutes.

There has been described a rubber composition capable of affording rubber articles exhibiting a limited variation of electric resistivity in the semiconductive range and differently stated, having a stable electric resistivity independent of molding conditions. The composition is also improved in moldability and vulcanization, and provides cured rubbers which have good rubbery elasticity and do not release conductive carbon black. Therefore, articles of cured rubber resulting from the rubber composition according to the invention will find a variety of applications in business machines as rubber roll members and in the electrochemical industry and vehicle industry, for example, as automobile parts.

EXAMPLE

Examples of the invention are given below by way of illustration and not by way of limitation. Unless otherwise stated, all parts are by weight.

EXAMPLES 1-3 AND COMPARATIVE EXAMPLE 1

Polyolefin rubber composition 1A was obtained by blending the following ingredients in a pressure kneader.

| Ingredients | Parts by weight |
| --- | --- |
| EPDM Esplene 567[1] | 100 |
| Ketjen Black ® EC[2] | 7 |
| Industrial Liquid Paraffin PW380[3] | 20 |
| Antioxidant[4] | 1 |

[1] tradename, manufactured by Sumitomo Chemical K.K.
[2] tradename, manufactured by Ketjen Black International.
[3] tradename, manufactured by Idemitsu Kosan K.K.
[4] tradename Nocrack MB, manufactured by Ouchi Shinko Chemical K.K.

Silicone rubber composition 1B was obtained by blending the following ingredients in a pressure kneader.

| Ingredients | Parts by weight |
| --- | --- |
| Dimethylvinylpolysiloxane raw rubber consisting of 99.85 mol % of $(CH_3)_2SiO$ units and 0.15 mol % of $(CH_2=CH)(CH_3)SiO$ units and having a polymerization degree of 8,000 | 100 |
| Silica powder (specific surface area 200 m$^2$/g, Aerogel ® 200, manufactured by Nihon Aerogel K.K.) | 15 |
| Hydroxyl-terminated dimethylsiloxane fluid having a polymerization degree of 20 | 5 |

Compositions 1A and 1B were blended in the proportion shown in Table 1 using a roll mill. A rubber compound was prepared by adding dicumyl peroxide to the blend in the proportion shown in Table 1. The compound was shaped into sheets by heat pressing at 170° C. and 100 kgf/cm$^2$ for 10 minutes, the sheets being 2 mm thick for the measurement of physical properties and 1 mm thick for the measurement of volume resistivity.

For comparison purposes, a compound was prepared by adding 3.5 parts of Ketjen Black to 100 parts of silicone rubber composition 1B and measured for volume resistivity.

The volume resistivity was measured on 10 sheets of 1 mm thick for each example using a resistivity meter Model HT-210 manufactured by Mitsubishi Oil & Fat K.K., with the range of minimum to maximum measurements being reported in Table 1.

TABLE 1

|  | Example 1 | Example 2 | Example 3 | Comparative Example 1 |
|---|---|---|---|---|
| Composition |  |  |  |  |
| Polyolefin composition 1A | 70 | 50 | 30 | — |
| Silicone rubber composition 1B | 30 | 50 | 70 | 100 |
| Dicumyl peroxide | 1.6 | 1.6 | 1.6 | 1.6 |
| Ketjen Black EC | — | — | — | 3.5 |
| Physical properties |  |  |  |  |
| Hardness, JIS A | 37 | 33 | 31 | — |
| Tensile strength, kgf/cm$^2$ | 51 | 43 | 40 | — |
| Elongation, % | 650 | 700 | 800 | — |
| Volume resistivity, Ω·cm | $5 \times 10^6 - 5 \times 10^7$ | $5.5 \times 10^6 - 5.5 \times 10^7$ | $6.5 \times 10^6 - 7.8 \times 10^7$ | $5 \times 10^6 - 1 \times 10^{10}$ |

EXAMPLES 4-6

Polyolefin rubber composition 2A was obtained by blending the following ingredients in a two-roll mill.

| Ingredients | Parts by weight |
|---|---|
| EPDM PX-007[1] | 100 |
| Ketjen Black ® EC[2] | 10 |
| Industrial Liquid Paraffin PW380[3] | 30 |

[1]tradename, manufactured by Mitsui Petro-Chemical K.K.
[2]tradename, manufactured by Ketjen Black International.
[3]tradename, manufactured by Idemitsu Kosan K.K.

Silicone rubber composition 2B was a dimethylvinylpoly siloxane raw rubber consisting of 99.5 mol % of $(CH_3)_2SiO$ units and 0.5 mol % of $(CH_2=CH)(CH_3)SiO$ units and having an average polymerization degree of 8,000.

Compositions 2A and 2B were blended in the proportion shown in Table 2. A rubber compound was prepared by adding dicumyl peroxide and precipitating silica Nipsil ® LP having a specific surface area of 230 m$^2$/g (manufactured by Nihon Silica K.K.) to the blend in the proportion shown in Table 2. The compound was shaped into sheets of 2 mm and 1 mm thick for the measurement of physical properties and volume resistivity as in Example 1.

The results are shown in Table 2.

| Ingredients | Parts by weight |
|---|---|
| EPDM PX-007[1] | 100 |
| Denka Acetylene Black[2] | 15 |
| Process oil, Sunpar 2280[3] | 20 |

[1]tradename manufactured by Mitsui Petro-Chemical K.K.
[2]tradename, manufactured by Denki Kagaku K.K.
[3]tradename, manufactured by Nihon Sun Oil K.K.

Silicone rubber composition 3B was obtained by blending the following ingredients in a kneader and heat treating the blend at 170° C. for two hours.

| Ingredients | Parts by weight |
|---|---|
| Dimethylvinylpolysiloxane[1] | 100 |
| Silica powder[2] | 25 |
| Dimethylsiloxane fluid[3] | 5 |

[1]consisting of 99.85 mol % of $(CH_3)_2SiO$ units and 0.15 mol % of $(CH_2=CH)(CH_3)SiO$ units and having a polymerization degree of 8,000
[2]tradename Aerogel ® 200, specific surface area 200 m$^2$/g, manufactured by Nihon Aerogel K.K.
[3]Hydroxyl-terminated dimethylsiloxane fluid having a polymerization degree of 20

A compound was prepared by mixing compositions 3A and 3B, quartz powder Crystalite ® VXS (manufactured by Tatsumori K.K.), and 2,5-dimethyl-2,5-bis(t-butylperoxy)hexane in the proportion shown in Table 3, and then shaped into sheets of 2 mm and 1 mm thick for the measurement of physical properties and volume

TABLE 2

|  | Example 4 | Example 5 | Example 6 |
|---|---|---|---|
| Composition |  |  |  |
| Polyolefin composition 2A | 70 | 50 | 30 |
| Silicone rubber composition 2B | 30 | 50 | 70 |
| Dicumyl peroxide | 1.6 | 1.6 | 1.6 |
| Silica powder | 5 | 5 | 5 |
| Physical properties |  |  |  |
| Hardness, JIS A | 35 | 31 | 28 |
| Tensile strength, kgf/cm$^2$ | 40 | 35 | 35 |
| Elongation, % | 450 | 460 | 500 |
| Volume resistivity, Ω·cm | $1 \times 10^4 - 1 \times 10^5$ | $5 \times 10^4 - 5 \times 10^5$ | $1 \times 10^5 - 1 \times 10^6$ |

EXAMPLES 7-9 AND COMPARATIVE EXAMPLE 2

Polyolefin composition 3A was obtained by blending the following ingredients in a pressure kneader.

resistivity as in Example 1.

For comparison purposes, a compound was prepared by adding 7.5 parts of Denka Acetylene Black and Crystalite ®VXS to 100 parts of silicone rubber composition 3B and measured for the same properties.

The results are shown in Table 3.

TABLE 3

|  | Example 7 | Example 8 | Example 9 | Comparative Example 2 |
|---|---|---|---|---|
| Composition |  |  |  |  |
| Polyolefin rubber composition 3A | 70 | 50 | 30 | — |
| Silicone rubber composition 3B | 30 | 50 | 70 | 100 |
| Quartz powder | 20 | 20 | 20 | 20 |

TABLE 3-continued

|  | Example 7 | Example 8 | Example 9 | Comparative Example 2 |
|---|---|---|---|---|
| Acetylene Black | — | — | — | 7.5 |
| 2,5-dimethyl-2,5-bis-(t-butylperoxy)hexane | 1.0 | 1.0 | 1.0 | 1.0 |
| Physical properties |  |  |  |  |
| Hardness, JIS A | 47 | 44 | 40 | 42 |
| Tensile strength, kgf/cm$^2$ | 85 | 70 | 61 | 80 |
| Elongation, % | 630 | 650 | 750 | 700 |
| Volume resistivity, $\Omega \cdot$ cm | $5 \times 10^4$–$5 \times 10^5$ | $7 \times 10^4$–$8 \times 10^5$ | $1 \times 10^5$–$1 \times 10^6$ | $1 \times 10^4$–$1 \times 10^{10}$ |

EXAMPLES 10–12 & COMPARATIVE EXAMPLE 3

Silicone-acryl rubber composition 4A was obtained by blending the following ingredients in a pressure kneader.

| Ingredients | Parts by weight |
|---|---|
| Silicone-acryl rubber[1] | 100 |
| Ketjen Black ® EC[2] | 5 |

[1] a copolymer consisting of 50 parts of ethyl acrylate,
25 parts of butyl acrylate,
24.5 parts of methoxyethyl acrylate, and
0.5 parts of

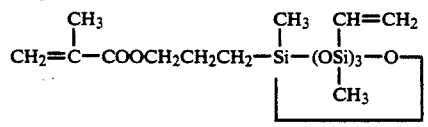

[2] tradename, manufactured by Ketjen Black International.

Silicone rubber composition 4B was obtained by blending the following ingredients in a pressure kneader.

| Ingredients | Parts by weight |
|---|---|
| Dimethylvinylpolysiloxane raw rubber consisting of 99.85 mol % of $(CH_3)_2SiO$ units and 0.15 mol % of $(CH_2=CH)(CH_3)SiO$ units and having a polymerization degree of 8,000 | 100 |
| Silica powder (specific surface area 200 m$^2$/g, Aerogel ® 200, manufactured by Nihon Aerogel K.K.) | 15 |
| Hydroxyl-terminated dimethylsiloxane fluid having a polymerization degree of 20 | 5 |

Compositions 4A and 4B were blended in the proportion shown in Table 4 using a roll mill. A rubber compound was prepared by adding dicumyl peroxide to the blend in the proportion shown in Table 4. The compound was shaped into sheets by heat pressing at 170° C. and 100 kgf/cm$^2$ for 10 minutes, the sheets being 2 mm thick for the measurement of physical properties and 1 mm thick for the measurement of volume resistivity.

For comparison purposes, a compound was prepared by adding 3.5 parts of Ketjen Black to 100 parts of silicone rubber composition 4B and measured for volume resistivity.

The volume resistivity was measured on 10 sheets of 1 mm thick for each example using a resistivity meter Model HT-210, with the range of minimum to maximum measurements being reported in Table 4.

TABLE 4

|  | Example 10 | Example 11 | Example 12 | Comparative Example 3 |
|---|---|---|---|---|
| Composition |  |  |  |  |
| Silicone acryl rubber comp. 4A | 70 | 50 | 30 | — |
| Silicone rubber composition 4B | 30 | 50 | 70 | 100 |
| Dicumyl peroxide | 1.6 | 1.6 | 1.6 | 1.6 |
| Ketjen Black EC | — | — | — | 3.5 |
| Physical properties |  |  |  |  |
| Hardness, JIS A | 35 | 33 | 30 | — |
| Tensile strength, kgf/cm$^2$ | 50 | 45 | 43 | — |
| Elongation, % | 750 | 760 | 810 | — |
| Volume resistivity, $\Omega \cdot$ cm | $2 \times 10^5$–$3 \times 10^6$ | $3 \times 10^5$–$3 \times 10^6$ | $1 \times 10^6$–$2 \times 10^7$ | $5 \times 10^6$–$1 \times 10^{10}$ |

EXAMPLES 13–15 AND COMPARATIVE EXAMPLE 4

Butyl rubber composition 5A was obtained by blending the following ingredients in a pressure kneader.

| Ingredients | Parts by weight |
|---|---|
| Butyl 365[1] | 100 |
| Denka Acetylene Black[2] | 15 |
| Zinc white | 5 |
| Stearic acid | 1 |

[1] tradename, manufactured by Nihon Synthetic Rubber K.K.
[2] tradename, manufactured by Denki Kagaku K.K.

Silicone rubber composition 5B was obtained by blending the following ingredients in a kneader and heat treating the blend at 170° C. for two hours.

| Ingredients | Parts by weight |
|---|---|
| Dimethylvinylpolysiloxane[1] | 100 |
| Silica powder[2] | 25 |
| Dimethylsiloxane fluid[3] | 5 |

[1] consisting of 99.85 mol % of $(CH_3)_2SiO$ units and 0.15 mol % $(CH_2=CH)(CH_3)SiO$ units and having a polymerization degree of 8,000
[2] tradename Aerogel ® 200, specific surface area 200 m$^2$/g, manufactured by Nihon Aerogel K.K.
[3] Hydroxyl-terminated dimethylsiloxane fluid having a polymerization degree of 20

A compound was prepared by mixing compositions 5A and 5B, quartz powder Crystalite ® VXS (manufactured by Tatsumori K.K.), sulfur and a curing accelerator in the proportion shown in Table 5, and then shaped into sheets of 2 mm and 1 mm thick for the measurement of physical properties and volume resistivity as in the foregoing Examples.

For comparison purposes, a compound was prepared by adding 7.5 parts of Denka Acetylene Black and 20 parts of Crystalite ® VXS to 100 parts of silicone rubber composition 5B, cured with dicumyl peroxide, and measured for the same properties. The results are shown in Table 5.

TABLE 5

| | Example 13 | Example 14 | Example 15 | Comparative Example 4 |
|---|---|---|---|---|
| Composition | | | | |
| Butyl rubber composition 5A | 80 | 75 | 50 | — |
| Silicone rubber composition 5B | 20 | 25 | 50 | 100 |
| Quartz powder | 20 | 20 | 20 | 20 |
| Acetylene black | — | — | — | 7.5 |
| Dicumyl peroxide | — | — | — | 2.0 |
| Sulfur | 2.0 | 2.0 | 2.0 | — |
| 2-mercaptobenzothiazole | 0.5 | 0.5 | 0.5 | — |
| Tetramethylthiuram monosulfide | 1.0 | 1.0 | 1.0 | — |
| Physical properties | | | | |
| Hardness, JIS A | 50 | 47 | 44 | 42 |
| Tensile strength, kgf/cm$^2$ | 70 | 65 | 63 | 80 |
| Elongation, % | 650 | 640 | 640 | 700 |
| Volume resistivity, $\Omega \cdot cm$ | $1 \times 10^5 - 1 \times 10^6$ | $2 \times 10^5 - 3 \times 10^6$ | $2 \times 10^5 - 3 \times 10^6$ | $1 \times 10^4 - 1 \times 10^{10}$ |

As is evident from Tables 1 through 5, the vulcanized rubbers resulting from the rubber compositions falling within the scope of the invention have a stable electric resistivity in the semiconductive range as compared with the conventional silicone rubbers filled with conductive carbon black. The variation of electric resistivity is of the order of only one figure for the compositions of the invention, which contrasts with the conventional carbon black filled silicone rubbers showing a variation of the order of 4 to 6 figures.

Although some preferred embodiments have been described, many modifications and variations may be made thereto in the light of the above teachings. It is therefore to be understood that within the scope of the appended claims, the invention may be practiced otherwise than as specifically described.

We claim:

1. A rubber composition for preparing a rubber article having a variation of electric resistivity of about one order of magnitude in the range of from $10^3$ to $10^{10}$ $\Omega \cdot cm$ comprising in admixture, two separate phases (A) and (B) macroscopically dispersed in one another wherein, phase (A) is a rubber composition comprising natural rubber, synthetic rubber, or mixtures thereof, and conductive carbon black, said synthetic rubber being ethylene-propylene rubber, ethylene-propylene-diene rubber, styrene-butadiene rubber, acrylonitrile-butadiene rubber, hydrogenated acrylonitrile-butadiene rubber, butadiene rubber, isoprene rubber, chloroprene rubber, acrylic rubber, silicone-modified EPDM rubber, silicone-modified acrylic rubber, ethylene-acrylate rubber, ethylene-vinyl acetate rubber, urethane rubber, polysulfide rubber, chloro-sulfonated polyethylene rubber, chlorinated polyethylene rubber, fluorinated rubber, epichlorohydrin rubber, or mixtures thereof, and phase (B) is a silicone rubber composition comprising an organopolysiloxane having the average composition formula (1):

$$R_n SiO_{(4-n)/2} \qquad (1)$$

wherein R is a substituted or unsubstituted monovalent hydrocarbon group having 1 to 10 carbon atoms, and n is a positive number of from 1.95 to 2.05, and containing essentially no carbon black, wherein rubber compositions (A) and (B) are combined in a weight ratio of 5:95 to 95:5.

2. The composition of claim 1 wherein the synthetic rubber is an ethylene-propylene rubber or an ethylene-propylenediene rubber.

3. The composition of claim 1 wherein the synthetic rubber is selected from the group consisting of a styrene-butadiene rubber, acrylonitrile-butadiene rubber, hydrogenated acrylonitrile-butadiene rubber, butadiene rubber, isoprene rubber, chloroprene rubber, acrylic rubber, silicone-modified EPDM rubber, silicone-modified acrylic rubber, ethylene-acrylate rubber, ethylene-vinyl acetate rubber, urethane rubber, polysulfide rubber, chlorosulfonated polyethylene rubber, chlorinated polyethylene rubber, fluorinated rubber, and epichlorohydrin rubber.

4. The composition of claim 1 wherein rubber compositions (A) and (B) are admixed in a weight ratio of 20:80 to 80:20.

5. The composition of claim 1 which contains 5 to 95% by weight of the organopolysiloxane.

6. The composition of claim 1 wherein rubber composition (A) contains 1 to 50 parts by weight of carbon black per 100 parts by weight of the total of natural rubber synthetic rubber or mixture thereof.

7. A method for preparing a rubber composition comprising combining (A) a rubber composition comprising natural rubber, synthetic rubber, or mixtures thereof and conductive carbon black, said synthetic rubber being ethylene-propylene rubber, ethylene-propylene-diene rubber, styrene-butadiene rubber, acrylonitrile-butadiene rubber, hydrogenated acrylonitrile-butadiene rubber, butadiene rubber, isoprene rubber, chloroprene rubber, acrylic rubber, silicone-modified EPDM rubber, silicone-modified acrylic rubber, ethylene-acrylate rubber, ethylene-vinyl acetate rubber, urethane rubber, polysulfide rubber, chloro-sulfonated polyethylene rubber, chlorinated polyethylene rubber, fluorinated rubber, epichlorohydrin rubber, or mixtures thereof, with (B) a silicone rubber composition comprising an organopolysiloxane having the average composition formula (1):

$$R_nSiO_{(4-n)/2} \qquad (1)$$

wherein R is a substituted or unsubstituted monovalent hydrocarbon group having 1 to 10 carbon atoms, and n is a positive number of from 1.95 to 2.05, and containing no carbon black, wherein rubber compositions (A) and (B) are combined in a weight ratio of 5:95 to 95:5 to form a two-phase mixture of rubber compositions (A) and (B) macroscopically dispersed in one another.

8. The method of claim 7 wherein the synthetic rubber is an ethylene-propylene rubber or an ethylene-propylene-diene rubber.

9. The method of claim 7 wherein the synthetic rubber is selected from the group consisting of a styrene-butadiene rubber, acrylonitrile-butadiene rubber, hydrogenated acrylonitrile-butadiene rubber, butadiene rubber, isoprene rubber, chloroprene rubber, acrylic rubber, silicone-modified EPDM rubber, silicone-modified acrylic rubber, ethylene-acrylate rubber, ethylene-vinyl acetate rubber, urethane rubber, polysulfide rubber, chlorosulfonated polyethylene rubber, chlorinated polyethylene rubber, fluorinated rubber, and epichlorohydrin rubber.

10. The method of claim 7 wherein rubber compositions (A) and (B) are mixed in a weight ratio of 20:80 to 80:20.

11. A composition of claim 1 which contains 20–80% by weight of the organopolysiloxane.

* * * * *